United States Patent [19]
Hutchinson

[11] 3,799,995
[45] Mar. 26, 1974

[54] PREPARATION OF OMEGA-HYDROPERFLUOROALKANES

[75] Inventor: John Hutchinson, Runcorn, England

[73] Assignee: Imperial Chemical Industries Limited, London, England

[22] Filed: Aug. 6, 1971

[21] Appl. No.: 169,859

Related U.S. Application Data
[63] Continuation-in-part of Ser. No. 750,014, Aug. 5, 1968, abandoned.

[52] U.S. Cl. ............................................. 260/653
[51] Int. Cl. ..................... C07c 17/22, C07c 19/08
[58] Field of Search .................................... 260/653

[56] References Cited
UNITED STATES PATENTS
2,980,740   4/1961   Hasek et al. .................... 260/653.8

*Primary Examiner*—Daniel D. Horwitz
*Attorney, Agent, or Firm*—Cushman, Darby & Cushman

[57] ABSTRACT

A process for making ω-hydroperfluoroalkanes $H(CF_2)nF$ wherein n is an even integer equal to at least two and not great than 14 which comprises heating a fluorinated primary alcohol $H(CF_2)nCH_2OH$ with a metal fluoride selected from the group consisting of cobalt trifluoride, chromium trifluoride, manganese trifluoride, cerium tetrafluoride, lead tetrafluoride, bismuth pentafluoride and silver difluoride at a temperature of 50° C to 350° C.

5 Claims, No Drawings

PREPARATION OF OMEGA-HYDROPERFLUOROALKANES

This application is a continuation-in-part of my co-pending application Ser. No. 750,014 filed Aug. 5, 1968, now abandoned.

This invention relates to highly fluorinated alkanes, particularly to the preparation of ω-hydroperfluoroalkanes containing four or more carbon atoms in the molecule.

It is known, for example from U.S. specification Pat. No. 2,559,628, to make fluorinated primary alcohols having the empirical formula $H(CF_2)_nCH_2OH$, where $n$ is an even integer equal to two or more, by reactions between tetrafluoroethylene and methanol in the presence of a free-radical initiator. We have now found that these fluorinated primary alcohols can be further fluorinated by heating with cobalt trifluoride or other fluorinating metal fluorides. Surprisingly, the fluorination reaction proceeds with the replacement of the terminal $CH_2OH$ group by a fluoride atom and the formation of an ω-hydroperfluoroalkane. Since ω-hydroperfluoroalkanes can be oxidised to give perfluoroacid fluorides in high yield, as described for example in U.S. specification Pat. No. 2,790,815, and since these can in turn be readily hydrolysed to their corresponding perfluoroacids having useful surface-active properties the process of the invention constitutes a step in a process for making useful straight-chain perfluoroacids from tetrafluoroethylene.

The invention thus provides a process for making ω-hydroperfluoroalkanes comprising heating a fluorinated alcohol having the empirical formula $H(CF_2)_nCH_2OH$, where n is an even integer equal to two or more, with a metal fluoride in its highest valency state, the metal having a higher oxidation potential than mercury.

The process of the invention is especially useful when starting materials in which $n$ is an even integer in the range two to 14 are employed because perfluoroacids containing perfluorocarbon chains with lengths in this range show the most useful surface-active properties.

However, if desired, the process may be applied to fluorinated primary alcohols of the given formula in which n has other values, and in particular even integer values in excess of 14.

The metal fluorides used in the process are conventional fluorinating agents. The ionisation potential of the metal is a convenient measure of the strength of the fluorinating agent, and the definition of the metal as being one that has a higher oxidation potential than mercury is a convenient manner of describing those fluorides that are active as fluorinating agents in the present invention. Thus the operability of a particular metal fluoride in the process of the present invention may readily be determined by consulting a textbook which gives details of metal oxidation potentials, for example "Oxidation-Reduction Potentials" (second edition) by W M Latimer published by Prentice-Hall, New Jersey, at pages 339-340. These fluorides include cobalt trifluoride, chromium trifluoride, manganese trifluoride, cerium tetrafluoride, lead tetrafluoride, bismuth pentafluoride and silver difluoride or mixtures thereof.

The reactions take place at temperatures of 50° C to 400° C, although it is preferred to carry out the process of the invention at a temperature not exceeding 350° C in order to avoid thermal degradation of the fluorocarbon chains which tends to occur at high temperature. It is especially preferred to carry out the reaction at a temperature in the range 100° C to 200° C, since the reaction rate is slow at temperatures below about 100° C whilst above about 200° C significant proportions of perfluoroalkanes are formed as well as the ω-hydroperfluoroalkanes.

A convenient method of carrying out the reactions is to pass the perfluoroalcohol entrained in a stream of dry nitrogen over a layer of the metal fluoride, preferably cobalt trifluoride, supported in a nickel tube arranged for heating.

EXAMPLE 1

The fluoroalcohol $H(CF_2)_8CH_2OH$ (10 g) was entrained in a stream of dry nitrogen and passed during 15 minutes over a layer of 280 g of cobalt trifluoride supported in a nickel tube 30 inches long and 1 inch internal diameter heated to 180° C. The products were collected in suitably cooled traps and amounted to 7 g of a mixture of ω-hydroheptadecafluoro-n-octane and perfluoro-n-octane which were identified by their mass-spectra, infra-red spectra and by nuclear magnetic resonance measurements. The molar composition of the mixture was estimated by gas-chromatography to be seven of $HC_8F_{17}$ to one of $C_8F_{18}$.

EXAMPLE 2

The fluoroalcohol $H(CF_2)_6CH_2OH$ (20 g) was passed through the reactor described in Example 1 during 20 minutes at a temperature of 130° C to 140° C. The products collected amounted to 10 g of a mixture of ω-hydrotridecafluoro-n-hexane and perfluoro-n-hexane in a molar ratio of 15 to 1. The compounds were identified by their mass-spectra, infra-red spectra and by nuclear magnetic resonance measurements. When the reaction was carried out at 180° C the molar ratio was 6 to 1.

EXAMPLE 3

The fluoroalcohol $H(CF_2)_4CH_2OH$ (20 g) was passed through the reactor described in Example 1 during 15 minutes at a temperature of 130° C. The products collected amounted to 10 g of a mixture of ω-hydrononafluoro-n-butane and perfluoro-n-butane containing ca. 95% by weight of the former. These compounds were identified by their infra-red spectra.

EXAMPLE 4

The fluoroalcohol $H(CF_2)_{10}CH_2OH$ (15 g) was entrained in a stream of dry nitrogen and passed during two hours through the reactor described in Example 1 at a temperature of 180° C. The products were collected, separated by preparative gas-liquid chromatography and perfluoro-n-decane and 1-H-nonadecafluoro-n-decane were identified by their nuclear magnetic resonance, infra-red and mass-spectra.

I claim:

1. A process for making ω-hydroperfluoroalkanes $H(CF_2)_nF$, wherein $n$ is an even integer equal to at least two and not greater than 14, which comprises heating a fluorinated primary alcohol $H(CF_2)_n CH_2OH$ with a metal fluoride selected from the group consisting of cobalt trifluoride, chromium trifluoride, manganese trifluoride, cerium tetrafluoride, lead tetrafluoride, bismuth pentafluoride and silver difluoride, at a temperature of 50° C to 350° C.

2. A process as claimed in claim 1 wherein the metal fluoride is cobalt trifluoride.

3. A process as claimed in claim 1 in which the reaction temperature is 100° C to 200° C.

4. A process for making ω-hydroperfluoroalkanes $H(CF_2)_nF$, where $n$ is an even integer of two to 10, comprising heating a fluorinated primary alcohol $H(CF_2)_nCH_2OH$ with a metal fluoride selected from the group consisting of cobalt trifluoride, chromium trifluoride, manganese trifluoride, cerium tetrafluoride, lead tetrafluoride, bismuth pentafluoride and silver difluoride, at a temperature of 50° C to 350° C.

5. A process as claimed in claim 4 wherein the metal fluoride is cobalt trifluoride.

* * * * *

UNITED STATES PATENT OFFICE
CERTIFICATE OF CORRECTION

Patent No. 3,799,995　　　　　　　　　Dated March 26, 1974

Inventor(s) John Hutchinson

It is certified that error appears in the above-identified patent and that said Letters Patent are hereby corrected as shown below:

Please add to the heading:

--[30] Foreign Application Priority Data

August 24, 1967　Great Britain . . . . 39063/67--

Signed and Sealed this

Eighteenth Day of January 1977

[SEAL]

Attest:

RUTH C. MASON
Attesting Officer

C. MARSHALL DANN
Commissioner of Patents and Trademarks